United States Patent
Antier et al.

(10) Patent No.: US 11,221,468 B2
(45) Date of Patent: Jan. 11, 2022

(54) OPTICAL IMAGING MODULE HAVING A HYPER-HEMISPHERICAL FIELD AND CONTROLLED DISTORTION AND COMPATIBLE WITH AN OUTSIDE ENVIRONMENT

(71) Applicant: THALES, Courbevoie (FR)

(72) Inventors: Catherine Antier, Elancourt (FR); Thierry Midavaine, Paris (FR)

(73) Assignee: THALES, Courbevoie (FR)

( * ) Notice: Subject to any disclaimer, the term of this patent is extended or adjusted under 35 U.S.C. 154(b) by 1605 days.

(21) Appl. No.: 15/104,933

(22) PCT Filed: Dec. 4, 2014

(86) PCT No.: PCT/EP2014/076581
§ 371 (c)(1),
(2) Date: Jun. 15, 2016

(87) PCT Pub. No.: WO2015/091002
PCT Pub. Date: Jun. 25, 2015

(65) Prior Publication Data
US 2021/0278639 A1 Sep. 9, 2021

(30) Foreign Application Priority Data
Dec. 20, 2013 (FR) ...................................... 1303027

(51) Int. Cl.
*G02B 13/06* (2006.01)
*G02B 13/14* (2006.01)
*G02B 27/10* (2006.01)

(52) U.S. Cl.
CPC ........... *G02B 13/06* (2013.01); *G02B 13/146* (2013.01); *G02B 27/1006* (2013.01)

(58) Field of Classification Search
CPC ... G02B 13/06; G02B 13/146; G02B 27/1006
See application file for complete search history.

(56) References Cited

U.S. PATENT DOCUMENTS 3,737,214 A 6/1973 Shimizu
6,115,193 A 9/2000 Shu
(Continued)

FOREIGN PATENT DOCUMENTS

CA 2 087 467 A1 8/1993
EP 0490497 A2 * 6/1992 ......... G02B 17/0808
(Continued)

OTHER PUBLICATIONS

Hicks, "Designing a mirror to realize a given projection", Journal of the Optical Society of America A, vol. 22, Issue 2, pp. 323-330, (2005).

*Primary Examiner* — Alicia M Harrington
(74) *Attorney, Agent, or Firm* — BakerHostetler

(57) ABSTRACT

An imaging module includes a single-pupil head component with hyper-hemispherical entrance field with refractive entrance surface, concave exit face, a refractive central zone and reflective peripheral zone. The imaging module also includes a secondary mirror, an aberrations corrector having an aspherical lens, a focusing objective, and an aperture diaphragm between the aberrations corrector and the objective. The head component is quasi-afocal in the vicinity of the field of 90° angular radius, its entrance surface has a ½ vertex angle of smaller than 30°, the secondary mirror is aspherical with variable local focal length with a maximum local power for a zone used by a field of 90° angular radius and minimum smaller by at least a factor of 2 for a zone used by a field of angular radius smaller than 20°.

13 Claims, 4 Drawing Sheets

(56) References Cited

U.S. PATENT DOCUMENTS

| | | |
|---|---|---|
| 6,449,103 B1 | 9/2002 | Charles |
| 7,173,776 B2 | 2/2007 | Tada et al. |
| 7,554,753 B2 | 6/2009 | Wakamiya |
| 2013/0057971 A1 | 3/2013 | Zhao et al. |

FOREIGN PATENT DOCUMENTS

| | | | |
|---|---|---|---|
| EP | 2 163 933 A1 | 3/2010 | |
| EP | 2 172 798 A1 | 4/2010 | |
| FR | 2 826 221 A1 | 12/2002 | |
| WO | WO-2007015236 A1 * | 2/2007 | ........... G02B 13/146 |

* cited by examiner

OPTICAL IMAGING MODULE HAVING A HYPER-HEMISPHERICAL FIELD AND CONTROLLED DISTORTION AND COMPATIBLE WITH AN OUTSIDE ENVIRONMENT

CROSS-REFERENCE TO RELATED APPLICATIONS

This application is a National Stage of International patent application PCT/EP2014/076581, filed on Dec. 4, 2014, which claims priority to foreign French patent application No. FR 1303027, filed on Dec. 20, 2013, the disclosures of which are incorporated by reference in their entirety.

FIELD OF THE INVENTION

The domain of the invention is that of optical imaging modules with hyper-hemispherical field with a single-pupil head component.

BACKGROUND

An optical imaging module is sought which meets the following requirements:
- hyper-hemispherical field with vertical aiming,
- making it possible to produce an optic with focal length varying in the field, so that the radial resolution of the system varies in the field by a factor of greater than 2 and is a minimum in the vicinity of the horizontal field, so that the details around the horizon can be seen better while seeing the remainder of the field,
- compatible with outdoor use: rain, . . . ,
- compatible with use in a system with large aperture typically greater than f/3 (this relates to the aperture defined by the aperture number N in the expression f/N, with $N=1/(2 \times \sin \alpha)$ where $\alpha$ is the ½ vertex angle of the beams focusing at a given point of the detector; here we have N<3) and which can be employed in a multi-spectral compact architecture.

Among the various existing optronic systems may be cited the systems:
- with lens head-mounted,
- with convex dome and mirror head-mounted,
- with solid head element with refractive convex entrance face followed by a concave or convex primary mirror,
- with solid head element with conical refractive entrance face.

Conventionally for systems with lens head-mounted, the optics with hyper-hemispherical field are refractive optics of "fish-eye" type comprising a divergent head group and an image reworking group generally consisting of an intermediate group stationing the image afar, associated with a rear focusing group. Such systems are for example described in documents U.S. Pat. No. 3,737,214 of 1973, and U.S. Pat. No. 7,173,776 of 2007. The aperture diaphragm also referred to as the stop can be positioned so as to obtain a telecentric optic as shown for example in document U.S. Pat. No. 7,554,753.

Certain lenses can make it possible to obtain a variable radial resolution in the field (example: patent FR 2 826 221). Otherwise, no system is known which has an optic with focal length varying in the field other than one with dioptric elements head-mounted.

In all systems with lens head-mounted, to obtain vertical aiming toward the zenith, the head component has a surface whose tangent planes are close to the horizontal, resulting in limited compatibility with outdoor use in case of bad weather, rain drops noticeably disturbing the image because of the small dimension of the pupil, similar to that of the water drop.

Certain optics with hyper-hemispherical field use a mirror head-mounted. In this case, for outdoor use the system must possess in front of this mirror a protection dome, which increases bulkiness and cost, in particular when the dome is made of glass or sapphire, and which makes the system fragile if the thickness of the dome is small or if the latter is made of soft material, plastic for example. This type of architecture with convex dome and mirror, is used mainly inside for shop surveillance or outdoors with vertical aiming toward the ground for street surveillance, thereby allowing the closure dome to be protected from direct bad weather. On the other hand, in the case of vertical aiming toward the zenith outside, this type of system is as or indeed more fragile than a conventional fish-eye.

To alleviate this drawback, in the case of an annular field with typical elevation of 40° (field height of 40°) in panoramic vision (field width of 360°), it is possible to use a solid head group with single or dual elements, with refractive convex entrance face followed by a concave primary mirror making it possible to converge the beams, generally toward a second mirror placed at the center of the refractive entrance face, thereby achieving greater compactness. This mixed refractive/reflective group can consist of a single "lens" or else of a doublet as described in patent US 2013/0057971. These systems with solid head element with refractive convex entrance face followed by a concave primary mirror have the drawback of having a limited field in terms of elevation. Moreover, in the case of vertical aiming toward the zenith, the entrance surface remains close to the horizontal on its larger zone, thus not solving the problem of bad weather during outside use.

Systems with solid head element with refractive convex entrance face followed by a convex primary mirror make it possible to obtain a wide field in terms of positive and negative elevation, hence they are used in particular when it is sought to address an omnidirectional field. In this case, in order to address a wide field, it is necessary to use a quasi- or hyper-hemispherical strongly convex entrance face covering most of the front and sides of the solid, the rear consisting mainly of the strongly convex primary mirror; such an example is described in patent U.S. Pat. No. 6,449,103.

Usually, the entrance face is highly inclined over the major part of its surface, thereby rendering this type of component compatible with outside use in case of bad weather. On the other hand, production of the head component is tricky, because of the strongly convex and aspherical shape of the entrance face. This is why this type of component is mainly produced by molding, firstly of plastic, thereby mainly limiting its use to components of small dimension (typically smaller than 50 mm) if one wishes to obtain imaging level optical quality.

Finally, systems with solid head element with conical refractive entrance face make it possible to access a wide field in terms of elevation, but are little used in imaging which requires good optical quality, given that certain fields attack the entrance face with a large angle of incidence, thus requiring, at the rear, good correction of aberrations. They are especially used as flux collector, for example in the case of a laser warning sensor with wide-field optic consisting of a refractive truncated cone bounded by 2 plane mirrors, the mirror M1 having a central zone receiving the beams after refraction only by the truncated cone, or refraction followed by a reflection by M1 followed by M2, or by M2 alone, and comprising a detector in this central zone (patent CA 2 087 467 of 1993).

Consequently, to date there is still a need for a system that is simultaneously satisfactory in respect of all the aforementioned requirements, in terms of hyper-hemispherical field with vertical aiming, of optic with focal length varying in the field, of outdoor use and in a large-aperture system, and that can be employed in a multi-spectral compact architecture.

The solution afforded consists of an imaging module comprising:
- a single-pupil head component quasi-afocal in the vicinity of the field of 90° angular radius, associated with
- an aberrations corrector also ensuring the transport of the image and of the pupil, at the exit of which is situated
- a focusing objective able to correct the field aberrations which remain on exit from the corrector, in particular aberrations of the field curvature and of astigmatism, and able to focus the rays arising from the scene to be imaged toward
- a detector.

It also comprises an aperture diaphragm situated between the aberrations corrector and the focusing objective.

SUMMARY OF THE INVENTION

More precisely the subject of the invention is an optical imaging module having an optical axis and comprising on this optical axis:
a single-pupil head component with hyper-hemispherical entrance field with refractive entrance surface and concave exit face as seen from outside the component, with refractive central zone (including the optical axis) and reflective peripheral zone referred to as primary mirror and,
comprising a secondary mirror with predetermined useful zone, associated with an optical aberrations corrector at the exit of which is situated an objective for focusing on a detector.

It is mainly characterized in that:
the head component is:
quasi-afocal in the vicinity of the field of 90° angular radius,
its entrance surface is a surface of revolution with straight generator inclined to the optical axis by an angle of smaller than 30° (that is to say a cylindrical or conical entrance surface of ½ vertex angle of smaller than 30°), and
the secondary mirror is aspherical with local focal length varying spatially over the useful zone with a maximum local power for a part of this zone used by a field of 90° angular radius and a minimum local power that is smaller by at least a factor of 2 for a part of this zone used by a field of angular radius <20° (that is to say toward the inside of the useful zone),
the aberrations corrector comprises at least one aspherical lens,
and in that the optical module comprises an aperture diaphragm situated between the aberrations corrector and the focusing objective.

An optical imaging module is thus obtained with hyper-hemispherical field and with controlled distortion allowing variations of radial resolution of a factor of greater than 2 in the field, comprising a solid single-pupil refractive/reflective head component, with entrance face of revolution with straight generator quasi-parallel to the optical axis, and the top face of which is reflective and forms an aspherical secondary mirror with even and odd coefficients, this component being associated with an aberrations corrector at the exit of which is situated the aperture diaphragm (stop).

The solution afforded makes it possible to solve the problem posed:
it is compatible with a hyper-hemispherical field with vertical aiming, with a possible but limited central dead zone;
it is compatible with outdoor use, by virtue of a quasi-vertical or indeed re-entrant entrance face, allowing good runoff of rain drops, which can be improved by periodic use of a suitable surface treatment; moreover, the entrance surface with straight generator facilitates the possible use of a motorized cleaning device of windshield wiper type;
the head component makes it possible to produce an optic with focal length varying in the field, so that the radial resolution of the imaging module varies in the field by a factor of greater than 2 and is a maximum in the vicinity of the horizontal field;
most of the optical functions of the head component being produced by reflection, it is compatible with a multi-spectral use, on condition that a material transparent in the various bands of use is chosen. It is more robust than a head component comprising mirrors and a dome;
as detailed further on, the aberrations corrector renders the module compatible with an optic of imaging quality, even in case of large aperture;
as detailed further on, the aberrations corrector also makes it possible to station the stop to the rear, and thus renders the module compatible with a multi-pathway architecture with aperture diaphragms specific to each pathway. Indeed, in this type of architecture, it is necessary to station the stop to the rear of the pathway splitter or splitters, that is to say far behind the head component.

The entrance surface typically has a ½ vertex angle of smaller than 5°.

According to a characteristic of the invention, the aberrations corrector comprises a single aspherical lens, the imaging module preferably having a typical aperture of smaller than f/5 (N>5) in the vicinity of the field of 90° angular radius and possessing a single aperture diaphragm (whatever the number of pathways) which is situated directly behind the aberrations corrector.

According to another characteristic of the invention, the aberrations corrector comprises three aspherical lenses, a first consisting of a meniscus with convex entrance face, a second consisting of a meniscus with concave entrance face and a third consisting of a conjugation lens, and the imaging module preferably having a typical aperture of greater than f/2 (N<2) in the vicinity of the field of 90° angular radius and/or possessing in the multi-pathway case, aperture diaphragms specific to each pathway situated at the rear of the pathway splitter.

Advantageously, the optical imaging module comprises at the exit of the aberrations corrector, a splitter of optical pathways, with at exit, a focusing objective and a detector per optical pathway, each focusing objective optionally comprising a spectral filter.

The detector is generally matrix-type; it is possible to use a linear array of photo detectors particularly in the IR3 region.

BRIEF DESCRIPTION OF THE DRAWINGS

Other characteristics and advantages of the invention will become apparent on reading the detailed description which follows, given by way of nonlimiting example and with reference to the appended drawings in which.

DETAILED DESCRIPTION

Figure 1A:
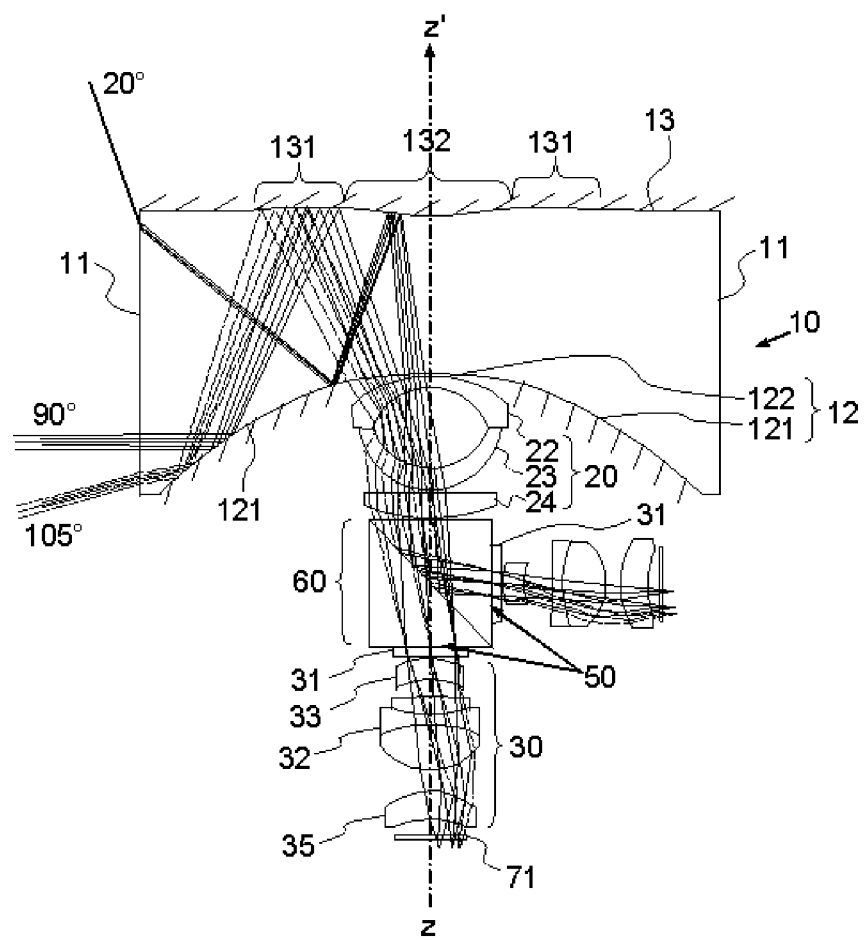
FIG. 1a schematically represents an example of first embodiment of an optical imaging module with two pathways according to the invention, seen in section with a variant with three pathways in FIG. 1b, FIGS. 2a-2c schematically represent an example of second embodiment of a single-pathway optical imaging module according to the invention, seen in section with for the head component, a cylindrical entrance surface (FIG. 2a), a conical entrance surface (FIG. 2b), an inverted conical entrance surface (FIG. 2c)

Across the figures, the same elements are labeled with the same references.

In the subsequent description, the expressions "vertical" "horizontal", "above" are used with reference to the orientation of the figures described, the vertical axis being the axis zz', the horizontal plane being perpendicular to zz'. Insofar as the device can be positioned according to other orientations, the directional terminology is indicated by way of illustration and is not limiting.

The subject of the invention is an optical imaging module having a vertical optical axis for vertical aiming toward the zenith, that is to say along zz' some examples of which are described in conjunction with FIGS. 1a-1b and 2a-2c. It comprises on this optical axis the following optical elements.

A single-pupil head component 10 with hyper-hemispherical field for example of the order of 200° to 220°, quasi-afocal in the vicinity of the field of 90° angular radius (that is to say typically varying between 90°±2°). The component is quasi-afocal in the sense that the sagittal and tangential images of an object situated in the vicinity of this horizontal field are the one real and the other virtual. It is single-pupil in the sense that all the optical pathways pass through the same pupil on exit from the head component.

Its refractive entrance surface 11 is a surface of revolution with straight generator inclined to the optical axis by an angle of smaller than 30°.

Its exit face 12 is concave as seen from outside the component with for the rays originating from the entrance face 11 and traveling through the component 10:
  a refractive central zone 122 and
  a reflective peripheral zone 121 referred to as primary mirror.

Figure 1B:
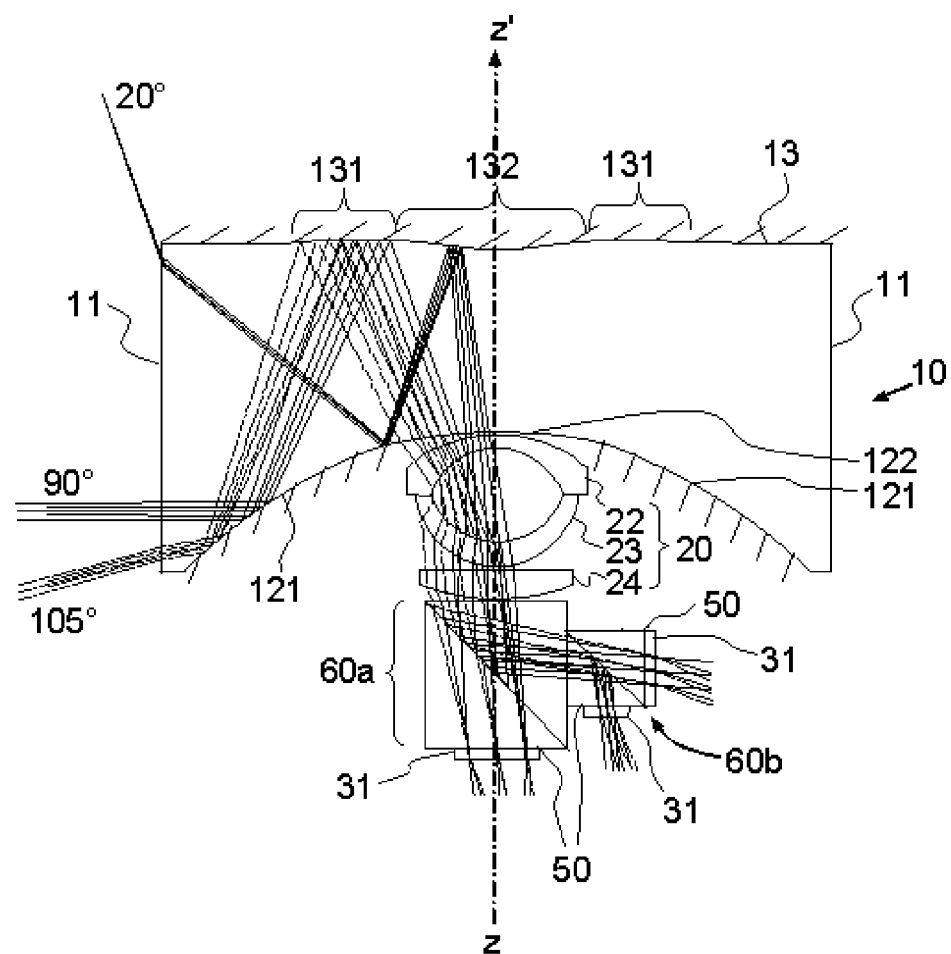
Figure 2A:
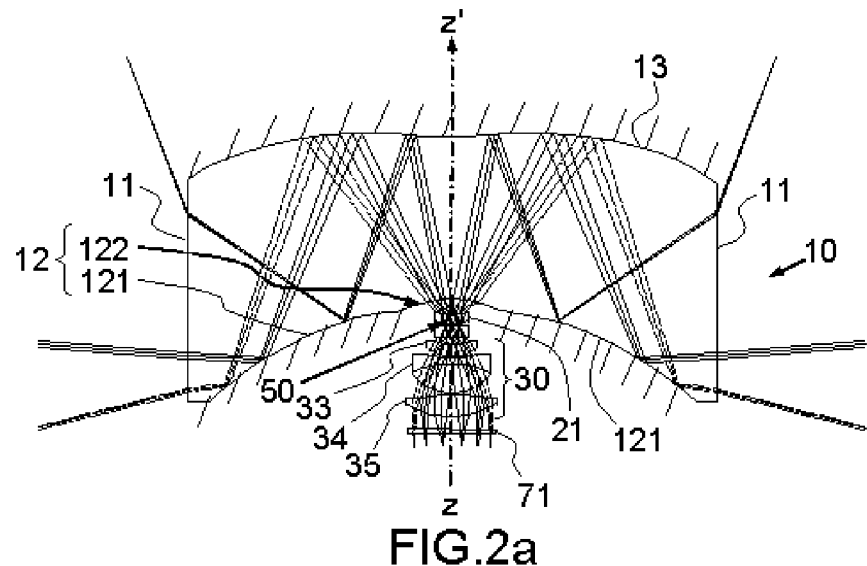
Figure 2B:
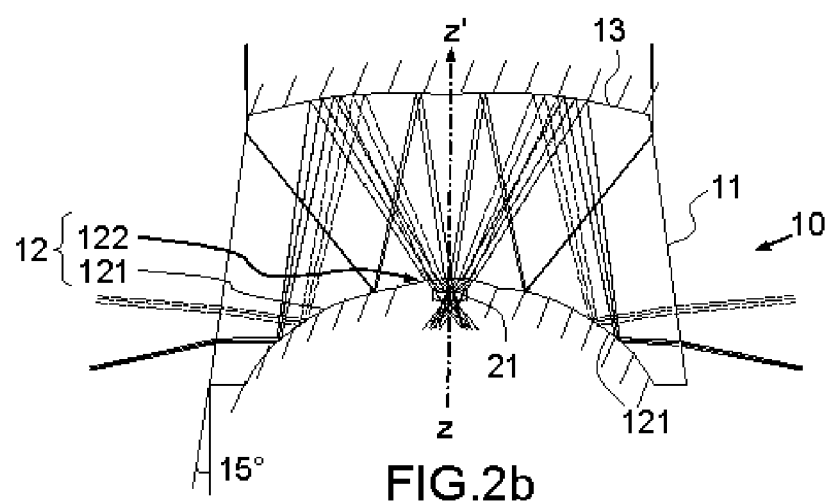
Figure 2C:
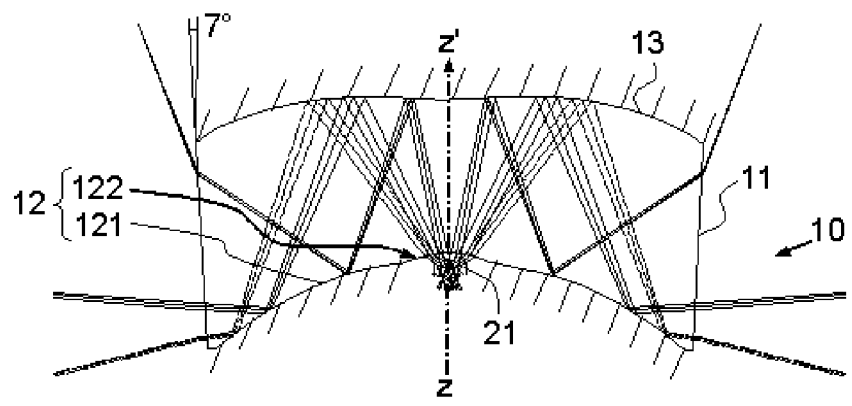

These two zones can consist of two adjoining surfaces of different radii of curvature with in this case, the aspherical peripheral zone 121 and the spherical central zone 122 as may be seen in FIGS. 2a, 2b and 2c, or of a single surface defined by one and the same, usually aspherical, geometric function as shown in FIGS. 1a and 1b.

The head component comprises a secondary mirror 13 with predetermined useful (that is to say reflecting) zone comprising an inside useful zone 132 and an outside useful zone 131. The inside useful zone 132 can exclude the center since the latter can exhibit a cusp point; said zone then corresponds to an annular field of view. The useful zone is aspherical with spatially varying focal length with a maximum local power forming a bell curve on the outside useful zone 131 and smaller by a factor of at least 2 (with respect to this maximum power) toward the inside of the inside useful zone 132, in such a way that the radial resolution is a minimum at the horizon; the local power varies continuously but not linearly as a function of the object field; as illustrated in FIG. 3, it exhibits a maximum corresponding to the zone used by the horizontal field and a minimum corresponding to the zone used by the vertical or quasi-vertical field (=of angular radius <20°), that is to say toward the inside of the inside zone 132. This allows the imaging module to possess a local focal length which varies by a factor of greater than 2 in the field. The local focal length fl is defined by the expression $fl(\theta)=dy/d\theta r$, in which dy is the elementary image field corresponding to an elementary object field $d\theta r$ of radial orientation and centered on the field of angular radius θ; the local power is $Pl(\theta)=1/fl(\theta)$.

This head component is associated with an aberrations corrector 20 which comprises at least one aspherical lens. But significant field aberrations still remain on exit from the aberrations corrector, in particular of the field curvature and of the astigmatism. These are corrected in a focusing objective 30 situated to the rear of the stop 50, as are the residual aperture aberrations.

Therefore at the exit of the optical aberrations corrector 20 is the focusing objective 30 able to focus the rays arising from the scene to be imaged in a focal plane where a matrix detector 40 is placed. It is also possible to use as detector 40, a linear array of photo detectors particularly in the IR3 region.

The optical module comprises an aperture diaphragm 50 (or stop) situated between the aberrations corrector 20 and the focusing objective 30.

All these optical elements are centered: they have radial symmetry about the optical axis zz'.

An example of first embodiment of an imaging module according to the invention is described in conjunction with FIG. 1a.

The entrance surface 11 of the head component is a surface of revolution with straight generator inclined to the optical axis by a zero angle. Stated otherwise this is a cylindrical surface whose faces are parallel to the optical axis zz': the faces are vertical.

The exit face 12 of the head component is concave as seen from outside with for the radii originating from the entrance face: a refractive central zone 122 and a reflective peripheral zone 121 forming the primary mirror. This peripheral zone 121 is preferably aspherical so as to improve the optical quality of the images.

In this example, to be compatible with a large aperture (this is the aperture defined by the aperture number N in the expression f/N, with $N=1/(2 \times \sin \alpha)$ where α is the ½ vertex angle of the beams focusing at a given point of the detector; here we typically have N<2) the aberrations corrector 20 consists of a group of 3 lenses:
  a first meniscus 22, usually aspherical, with convex entrance face, followed
  by a second meniscus 23 with concave entrance face, followed
  by a conjugation lens 24.

In this case, the imaging module therefore has a typical aperture of greater than f/2 (N<2) in the vicinity of the field of 90° angular radius and/or possesses, in the multi-pathway case, aperture diaphragms specific to each pathway situated at the rear of the pathway splitter.

In this example the imaging module has two pathways. For this purpose, it is furthermore furnished with a pathway splitter 60 such as a set of 2 prisms with 45° reflection on one of the pathways (case represented in FIG. 1a) or such as a set of 2 prisms with about 30° reflection followed by a total reflection or such as a splitter plate (optionally removable), with for each of the two separate pathways:

a focusing objective 30 itself optionally equipped with a spectral filter (which may or may not be situated near the splitter), and which comprises: a usually aspherical meniscus 33, a triplet 32 and a usually aspherical field lens 35;

a stop 50 stationed to the rear of the splitter to adapt to the aperture of the corresponding pathway, and carried by an iris diaphragm in the case of a variable aperture, or by the rear face of the splitter (case of FIG. 1a) or else by the spectral filter 31 which may be slightly set back from the splitter, for example if this spectral filter carries a phase filter and/or if it is mobile and comprises several positions corresponding to various discrete apertures.

In the case where one of the pathways possesses a significant aperture (typically greater than f/3, that is to say N<3), the depth of focus will be able to be increased by using a phase filter, preferably with symmetry of revolution, so as to favor the obtaining of uniform image quality over the whole field. This filter will be placed at the level of the aperture diaphragm and will be able to be situated for example on one of the faces of the spectral filter when such a filter is placed in the pathway, or else for example at the rear face of the splitter when a splitter is present. In the latter case, the rear face of the splitter must be in contact with the ambient medium (air or nitrogen usually).

a detector (The detectors are not represented in the figures so as not to overload them, but the porthole 71 of the detector is shown in FIG. 1a as well as FIG. 2a).

According to a variant of this embodiment, illustrated in FIG. 1b, this time the imaging module with three pathways is equipped with two pathway splitters: a first splitter 60a placed as in the example of FIG. 1a, the 2nd splitter 60b being situated on one of the 2 exits of the first splitter, according to an arbitrary orientation in this exit plane, so as to split two pathways received as input. Here again, each separate pathway is furnished with a focusing objective itself equipped with a spectral filter placed on the stop which is stationed to the rear to adapt to the aperture of the corresponding pathway. The focusing objective is not represented in this figure, nor in FIGS. 2b and 2c.

In FIGS. 1a-1b, rays are shown in only half the figure so as not to overload it, but of course the head component is not limited to these rays.

In an example of another embodiment shown in FIG. 2a, the imaging module is single-pathway. The entrance surface 11 of the head component is also cylindrical, with vertical faces.

The exit face 12 of the head component consists of a refractive and spherical central zone 122, and of an aspherical reflective outside zone 121 forming the primary mirror.

In this example, the aberrations corrector comprises a single corrective aspherical lens 21, and the small-diameter stop 50 is situated in proximity to the rear of the corrector. The imaging module has a typical aperture of smaller than f/5 (N>5) in the vicinity of the field of 90° angular radius and possesses a single aperture diaphragm (whatever the number of pathways) which is situated directly behind the aberrations corrector.

The focusing objective 30 optionally equipped with a spectral filter placed on the stop 50 comprises: a generally spherical meniscus 33, a doublet 34 and a usually aspherical field lens 35.

According to a first variant of this second embodiment, shown in FIG. 2b, the entrance surface 11 of the head component is conical, that is to say its generator is inclined to the optical axis by a non-zero angle of smaller than 30°, in this instance by an angle of 15° as indicated in the figure (the vertex of this angle of inclination to the optical axis zz' points toward z'). This makes it possible to obtain efficacious zenithal aiming.

According to a second variant of this second embodiment, shown in FIG. 2c, the entrance surface 11 of the head component is conical with inverted cone with respect to the previous example; it is inclined to the optical axis by an angle of 7° as indicated in the figure (the vertex of this angle of inclination to the optical axis zz' points toward z). This configuration is advantageous for use in a zone of bad weather (rain, snow, etc.).

Of course other examples of this second embodiment can be multi-pathway by being equipped with one or more pathway splitters, as has already been seen with FIGS. 1a-1b.

It is possible to use diverse materials for the head component 10. For applications to Visible Imaging (0.4-0.65 µm) and/or to Near Infrared Imaging (NIR 0.65-1 µm) and/or to SWIR Infrared Imaging (1.5-1.7 µm), and/or to NIR+SWIR Imaging (1 µm-1.7 µm), it is possible to use as material standard optical glass referred to under this generic designation or under its commercial brand name Schott N-BK7 or N-BK7HT preferably in the case where the SWIR pathway is used, without the generality of the reference being modified thereby. This glass has the advantage of being low cost, of existing as standard in large thickness, and of being relatively hard and insensitive to chemical agents. Among the other candidate materials may be cited in particular the glass referred to under its commercial brand name Schott N-SK2 or equivalent as well as Silica and moldable glasses.

For wider band multi-spectral applications, it is in particular possible to use as material of the head component multi-spectral ZnS (transparent from the Visible to the band III Infrared), Alon (hard material which is transparent from the Visible to the band II Infrared), Silicon (transparent in the SWIR and IR II bands) materials undergoing development such as ceramics (hard materials which are transparent from the Near Infrared to the band III Infrared).

The entrance surface 11 is advantageously covered with a hydrophobic treatment.

Some examples of optical characteristics which can be obtained for a panoramic monitoring application will be found hereinbelow:

| Examples of optical characteristics that can be obtained | NIR Pathway | VIS Pathway | SWIR Pathway No. 1 | SWIR Pathway No. 2 |
|---|---|---|---|---|
| Spectral band (nm) | 650-1000 | 400-650 | 1000-1700 | 1000-1700 |
| Object optical field (°) | 220 | 220 | 220 | 220 |
| Non vignetted angles of elevation (°) | +75/−20 | +75/−20 | +75/−20 | +75/−20 |
| NA horizontal field (optical field angular radius: 90°) | 1.9 | 3.8 | 3.8 | 3.8 |

| Examples of optical characteristics that can be obtained | NIR Pathway | VIS Pathway | SWIR Pathway No. 1 | SWIR Pathway No. 2 |
|---|---|---|---|---|

NA designating Numerical Aperture.

Horizontal field corresponds to a zero angle of elevation, that is to say to the horizontal object plane.

Figure 3A:
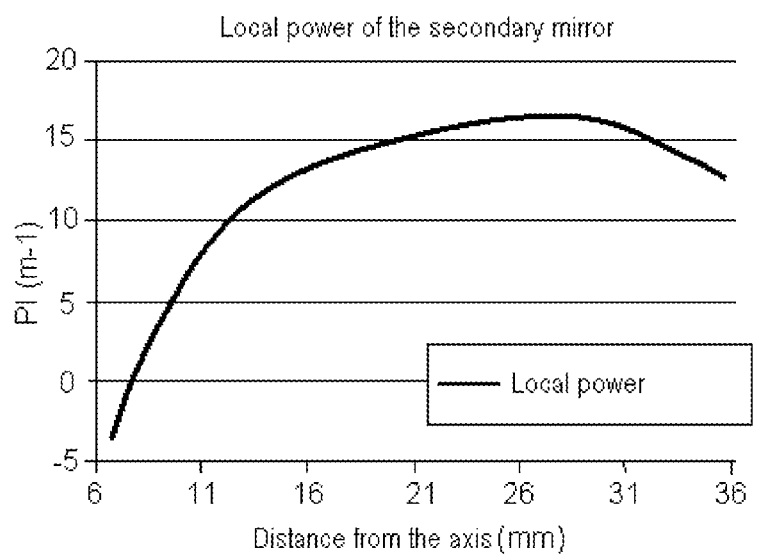
FIGS. 3a-3b show the spatial variation of the local power of the secondary mirror in the material as a function of the distance from the optical axis (FIG. 3a) as well as that of the local focal length of the imaging module (FIG. 3b) as a function of the direction of the object field.

Concerning the spatially varying focal length of the secondary mirror 13, it is for example possible to obtain with the characteristics hereinabove, as illustrated in FIG. 3a: a local power in the material of 1.8 m$^{-1}$ for a field at 30° to the axis, varying to 16.2 m$^{-1}$ for a field at 90° to the axis.

Figure 3B:
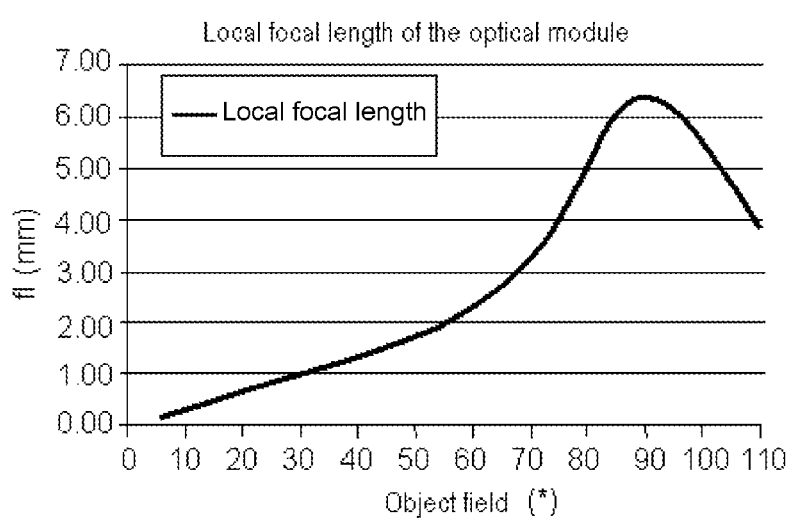

At the level of the optical module, it is then possible to obtain, as illustrated in FIG. 3b: a local focal length of 1 mm for a field at 30° to the axis, varying to 6.4 mm for a field at 90° to the axis.

Examples of optical characteristics that can be obtained

| Object field (°) | Local power secondary mirror (m−1) | Local focal length complete optic (mm) |
|---|---|---|
| 30 | 1.8 | 1.0 |
| 60 | 10.4 | 2.3 |
| 75 | 13.7 | 4.1 |
| 90 | 16.2 | 6.4 |
| 105 | 15.8 | 4.8 |

The following matrix-type detectors can for example be associated with the optics described hereinabove, thereby making it possible to obtain a spatially variable resolution as indicated hereinbelow, which follows the evolutions of the tangential resolution in terms of panoramic optics.

| Examples of sensor characteristics that can be obtained | NIR Pathway | VIS Pathway | SWIR Pathway No. 1 | SWIR Pathway No. 2 |
|---|---|---|---|---|
| Pixel spacing (μm) | 6.5 | 6.5 | 15 | 15 |
| Number of pixels of the detector | 2560 × 2160 | 2560 × 2160 | 1280 × 1024 | 640 × 512 |
| Radial resolution (mrad) horizontal field | 1.0 | 1.0 | 2.3 | 4.3 |
| Max radial resolution (mrad) at +/−15° of elevation | 1.6 | 1.6 | 3.7 | 6.7 |
| Radial resolution (mrad) at +30° of elevation | 2.8 | 2.8 | 6.5 | 11.9 |
| Radial resolution (mrad) at +60° of elevation | 6.6 | 6.6 | 15.1 | 27.7 |

The solution afforded is therefore particularly suitable for a day-night, vehicle-mounted, low-cost terrestrial surveillance system.

The hyper-hemispherical field makes it possible not only to observe threats situated in front of, to the rear of, on the sides of and above the vehicle, but also those situated at the foot of the latter (mines . . . ). Such an imaging module is single-block, thereby rendering its on-vehicle integration easier.

The mixed reflective/refractive solid module makes it possible to obtain much greater compactness than would be obtained with a conventional fish-eye, and thus renders the imaging module less vulnerable to threats.

To simultaneously obtain good resolution, controlled distortion and a large aperture, use is made of a head component of typical diameter 100 to 125 mm and of typical total thickness 40 to 60 mm, compatible with the dimensions of materials which are sufficiently hard to be used outside, such as optical glasses. In the case of smaller aperture, the head component, of typical diameter from 60 to 80 mm and of typical total thickness 30 to 40 mm, is moreover readily compatible with production by molding.

The resolution is maximum for the most frequent threats, situated in the vicinity of the horizontal line. Moreover, the threats situated at high elevation, such as infantrymen placed atop buildings in street combat, are also accessible. Moreover, this type of architecture is well suited to laser warning detection.

The shape of the entrance face renders the device particularly well suited to all-weather use.

The possibility of obtaining quality imaging with a large aperture renders the system compatible with day-night use. In particular, this enables the use of a detector without liquid cooling, thereby decreasing the cost and increasing the robustness thereof. This type of optical architecture can thus be employed for example with low noise Silicon, InGaAs, IR Non-cooled matrix-type detectors.

The compatibility with a multi-pathway optic makes it possible to associate various imaging pathways exhibiting complementary information, to which may optionally be added a detection pathway in respect of laser warnings and/or missile departure.

The shape of the head component allows relatively easy production by machining, compatible with hard substances which are usable outdoors, such as glass or certain infrared materials. Production is simplified (and cost decreased) in the case of a cylindrical entrance face and of a rear face consisting of a single surface.

The invention claimed is:

1. An optical imaging module having an optical axis and comprising on this optical axis:
   a single-pupil head component with hyper-hemispherical entrance field with refractive entrance surface and concave exit face as seen from outside the component, with refractive central zone and primary mirror in the reflective peripheral zone,
   and comprising a secondary mirror with predetermined reflecting zone,
   associated with an optical aberrations corrector where a light at the exit of the optical aberrations corrector enters
   an objective for focusing on
   a detector,
   wherein:

the single-pupil head component is quasi-afocal in the vicinity of the field of 90° angular radius, the refractive entrance surface is a surface of revolution with straight generator inclined to the optical axis by an angle of smaller than 30°, and the secondary mirror is aspherical with local focal length varying spatially over the reflecting zone of the secondary mirror with a maximum local power for a part of this zone used by a field of 90° angular radius and a minimum local power that is smaller by at least a factor of 2 for a part of this zone used by a field of angular radius smaller than 20°, the optical aberrations corrector comprises at least one aspherical lens, and wherein the optical imaging module comprises an aperture diaphragm situated between the aberrations corrector and the focusing objective.

2. The optical imaging module as claimed in claim 1, wherein for the entrance surface, the inclination of the straight generator forms a ½ vertex angle of smaller than 5°.

3. The optical imaging module as claimed in claim 1, wherein the secondary mirror has even and odd coefficients.

4. The optical imaging module as claimed in claim 1, wherein the reflecting zone of the secondary mirror is annular.

5. The optical imaging module as claimed in claim 1, wherein the primary mirror is aspherical and the refractive central zone of the exit face of the component is spherical.

6. The optical imaging module as claimed in claim 1, wherein the primary mirror and the refractive zone of the exit face of the head component correspond to a surface defined by one and the same geometric function.

7. The optical imaging module as claimed in claim 1, wherein the aberrations corrector comprises a single aspherical lens.

8. The optical imaging module as claimed in claim 1, wherein the aberrations corrector comprises three aspherical lenses, a first aspherical lens consisting of a meniscus with convex entrance face, a second aspherical lens consisting of a meniscus with concave entrance face and a third aspherical lens consisting of a conjugation lens.

9. The optical imaging module as claimed in claim 1, wherein the detector is matrix-type or is a linear array of photo detectors.

10. The optical imaging module as claimed in claim 1, comprising at the exit of the aberrations corrector at least one splitter of optical pathways, with at exit, a focusing objective and a detector per optical pathway.

11. The optical imaging module as claimed in claim 10, wherein the optical pathway is in the Visible and/or NIR and/or SWIR region.

12. The optical imaging module as claimed in claim 1, wherein each focusing objective comprises a spectral filter.

13. The optical imaging module as claimed in claim 1, wherein a phase filter with symmetry of revolution is placed at the level of the aperture diaphragm.

* * * * *